(12) United States Patent  
Van Camp et al.

(10) Patent No.: US 7,815,708 B2
(45) Date of Patent: Oct. 19, 2010

(54) PROCESS AND APPARATUS FOR RECOVERY OF NON-FERROUS METALS FROM ZINC RESIDUES

(75) Inventors: Maurits Van Camp, Mortsel (BE); Jonathan Aerts, Turnhout (BE); Benedict Janssens, Herentals (BE); Sven Santen, Hofors (SE)

(73) Assignee: Umicore, Brussels (BE)

( * ) Notice: Subject to any disclaimer, the term of this patent is extended or adjusted under 35 U.S.C. 154(b) by 561 days.

(21) Appl. No.: 10/573,681

(22) PCT Filed: Aug. 30, 2004

(86) PCT No.: PCT/EP2004/009685

§ 371 (c)(1), (2), (4) Date: Jan. 5, 2007

(87) PCT Pub. No.: WO2005/031014

PCT Pub. Date: Apr. 7, 2005

(65) Prior Publication Data

US 2007/0095169 A1    May 3, 2007

Related U.S. Application Data

(60) Provisional application No. 60/511,200, filed on Oct. 16, 2003.

(30) Foreign Application Priority Data

Sep. 29, 2003  (EP) .................................. 03078038

(51) Int. Cl.
*C22B 7/00* (2006.01)
*C22B 19/04* (2006.01)
*C22B 13/06* (2006.01)

(52) U.S. Cl. ...................... 75/693; 75/10.22; 75/10.47; 75/10.5; 75/10.29; 75/961

(58) Field of Classification Search ................ 75/961, 75/695, 659, 665, 10.22, 10.35, 10.47, 10.5, 75/10.54, 10.63, 10.29
See application file for complete search history.

(56) References Cited

U.S. PATENT DOCUMENTS 2,836,487 A    5/1958    Fastje et al.

(Continued)

FOREIGN PATENT DOCUMENTS

| GB | 2094772 | 9/1982 |
| SU | 1048810 A * | 7/1989 |
| WO | WO 98/36102 | 8/1998 |

OTHER PUBLICATIONS

Barnhart, C.L., ed. American College Dictionary. p. 1342. New York, NY. 1970.*

(Continued)

*Primary Examiner*—George Wyszomierski
*Assistant Examiner*—Tima M McGuthry-Banks
(74) *Attorney, Agent, or Firm*—Brinks, Hofer, Gilson & Lione

(57) ABSTRACT

The invention relates to a process for the separation and recovery of non-ferrous metals from zinc-bearing residues, in particular from residues produced by the zinc manufacturing industry. The process comprises the steps of: —subjecting the residue to a flash or agitated bath fuming step, thereby producing an Fe bearing slag and Zn- and Pb-bearing fumes; and —extracting the Zn- and Pb-bearing fumes and valorising Zn and Pb; characterised in that CaO, $SiO_2$ and MgO are added as a flux before or during the fuming step so as to obtain a final slag composition with: formula (I) all concentrations being expressed in wt %. The invention also relates to a single-chamber reactor for Zn-fuming equipped with one or more submerged plasma torches as heat and gas sources.

Figure 1:
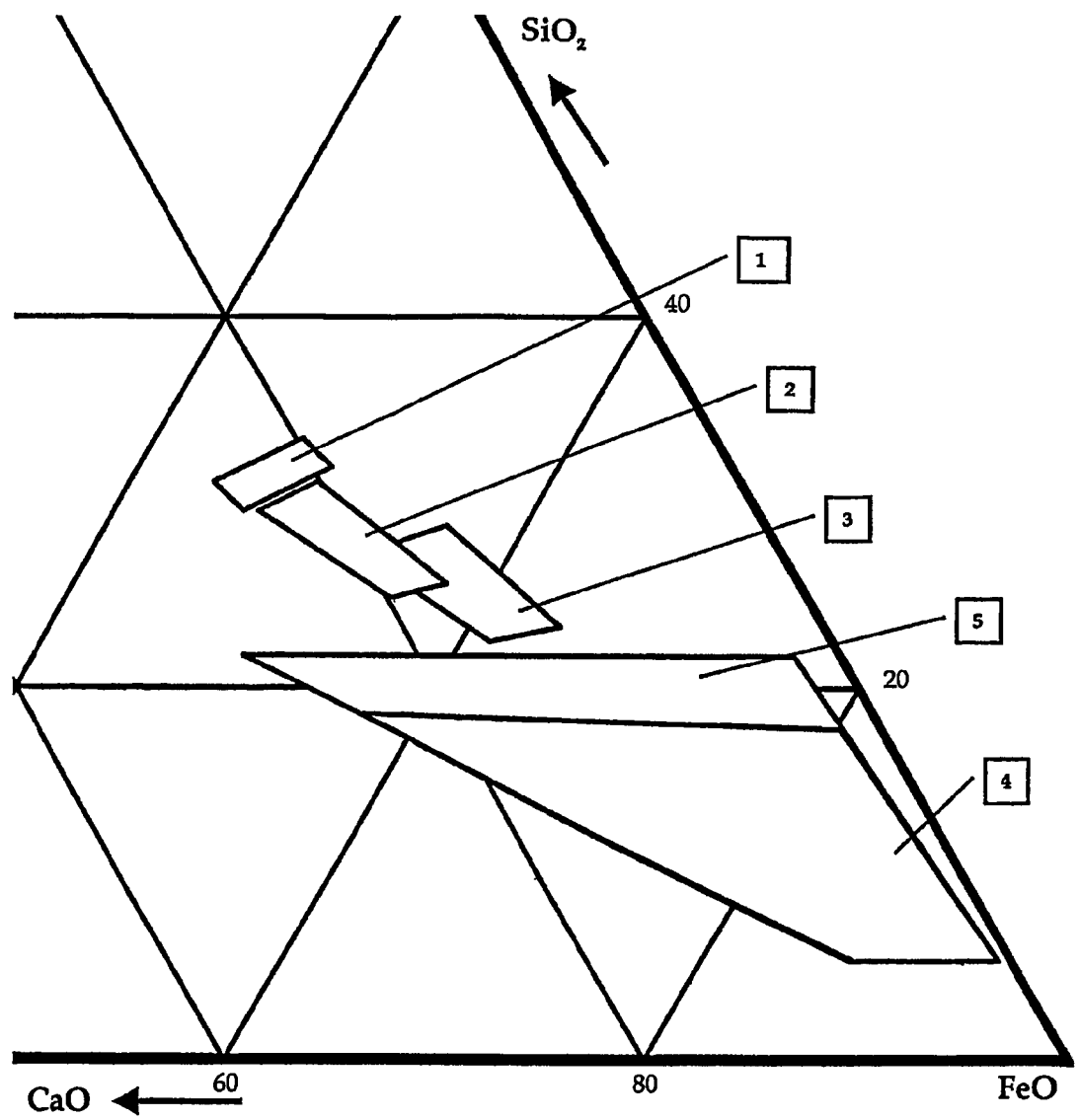

$$\frac{[Fe]}{[SiO_2]} + \frac{[CaO]}{[SiO_2]} + \frac{[MgO]}{3} > 3.5; \quad (I)$$

$$0.1 < \frac{[CaO]}{[SiO_2]} < 1.3; \text{ and}$$

$$6 < [SiO_2] < 22,$$

9 Claims, 1 Drawing Sheet

U.S. PATENT DOCUMENTS

| | | | |
|---|---|---|---|
| 2,932,566 | A | 4/1960 | Lumsden |
| 3,721,547 | A | 3/1973 | Dvorak |
| 3,756,804 | A | 9/1973 | Stevenson |
| 3,830,639 | A | 8/1974 | Evans et al. |
| 4,072,503 | A * | 2/1978 | Peterson et al. ............. 75/10.3 |
| 4,248,624 | A | 2/1981 | Novoa et al. |
| 4,415,356 | A | 11/1983 | Victorovich et al. |
| 4,415,540 | A | 11/1983 | Wilkomirsky et al. |
| 4,519,836 | A | 5/1985 | Sychev et al. |
| 4,521,245 | A | 6/1985 | Yarygin et al. |
| 4,571,260 | A | 2/1986 | Johansson et al. |
| 5,199,974 | A * | 4/1993 | Fugleberg .................... 75/659 |
| 5,256,186 | A * | 10/1993 | Player et al. ................. 75/695 |
| 5,282,881 | A * | 2/1994 | Baldock et al. .............. 75/500 |
| 5,922,261 | A | 7/1999 | Ford, Jr. |
| 5,942,023 | A | 8/1999 | Bitler et al. |
| 6,379,421 | B1 | 4/2002 | Salinas-Fernandez et al. |

OTHER PUBLICATIONS

XP-002310971 "Extn. of valuable components for metallurgical slags—by treatment of slag stream with hot neutral or reducing gas heated in arc plasmatron" Derwent Publications Ltd., Section Ch, Week 198223, Aug. 15, 1981, Abstract.

XP-002260042, De Schepper, "Liquid-Liquid Extraction of Germanium by LIX-63" Database Compendex, Database Accession No. EIX78110005759, Sep. 26, 1977, Abstract.

Jak et al., "Phase Equilibria and Thermodynamics of Zinc Fuming Slags" Canadian Metallurgical Quarterly, vol. 41, No. 2, pp. 163-174 (2002).

Esna-Ashari et al., "Smelting Reactor for Recovering Zinc from Industrial Low Zinc Bearing Residues," Erzmetall, Reiderer Verlag GmbH, Stuttgart, Germany, vol. 53, No. 6, (2000), pp. 373-384. (XP 000959985).

Heard et al., "Recycling of Zinc-Bearing Residues with the PRIMUS Process," Iron Steelmaker I and SM, vol. 30, No. 5, (Apr. 2003), pp. 55-60. (XP 009020220).

International Search Report and Written Opinion, issued in corresponding International Application No. PCT/EP2004/009685, dated Jan. 21, 2005.

International Preliminary Report on Patentability, issued in corresponding International Application No. PCT/EP2004/009685, dated Jan. 12, 2006.

International Search Report and Written Opinion, issued in commonly owned International Application No. PCT/EP2004/006238, dated Sep. 23, 2004.

International Preliminary Report on Patentability, issued in commonly owned International Application No. PCT/EP2004/006238, dated Oct. 7, 2005.

Office Action, dated Jul. 11, 2008, issued in co-pending, commonly assigned U.S. Appl. No. 10/562,347.

Office Action, dated Jan. 13, 2009, issued in co-pending, commonly assigned U.S. Appl. No. 10/562,347.

* cited by examiner though extensively discussed in the literature, inevitably somewhat fuzzy: typically, at least 20% of the Cu and at least 20% of the precious metals should report to the matte or alloy to deserve the epithet of significant. The rest is found in the fumes or in the slag. The production of such a matte or alloy, which captures Cu and precious metals, is highly beneficial as these metals can be separated easily from the slag.

PROCESS AND APPARATUS FOR RECOVERY OF NON-FERROUS METALS FROM ZINC RESIDUES

This application is a National Stage application of International Application No. PCT/EP2004/009685 filed Aug. 30, 2004, which claims the benefit of U.S. Provisional Application No. 60/511,200 filed Oct. 16, 2003, and which claims priority to EP 03078038.1, filed Sep. 29, 2003, the entire contents of which applications are hereby incorporated herein by reference in their entirety.

This invention relates to the recovery of non-ferrous metals from zinc-bearing residues, in particular from residues produced by the zinc manufacturing industry.

Blende, which is an impure ZnS ore, is the main starting material for the production of Zn. The typical industrial practice encompasses an oxidative roasting step, producing ZnO together with sulphates or oxides of the impurities. In subsequent steps, the ZnO in roasted blende is brought into solution by leaching in neutral conditions or in weak acidic conditions, thereby producing Zn-depleted residues, respectively referred to in this description as neutral leach residue and as weak acid leach residue. However, during roasting, part of the Zn reacts with Fe, a typical impurity present in blende, and forms relatively insoluble zinc ferrite. The leach residues therefore contain, besides lead sulphate, calcium sulphate and other impurities, a sizeable fraction of Zn in the form of ferrite. According to present practice, the recovery of the Zn from ferrite requires a specific hydro-metallurgical residue treatment using high acid concentrations of 50 to 200 g/l $H_2SO_4$. A disadvantage of this acidic treatment is that besides Zn, almost all the Fe and also other impurities such as As, Cu, Cd, Ni, Co, Tl, Sb are dissolved. As even low concentrations of these elements interfere with the subsequent electrowinning of Zn, they must be removed from the zinc sulphate solution. While Cu, Cd, Co, Ni and Tl are precipitated by addition of Zn powder, Fe is typically discarded as hematite, jarosite or goethite through hydrolysis. Due to the danger of washout of heavy metals, these Fe-bearing residues have to be disposed off in a well-controlled landfill. Landfilling of such residues has however come under heavy environmental pressure, rendering the sustainability of the process questionable. Another drawback of the above treatment is the loss of metals such as In, Ge, Ag and Zn in the Fe-bearing residue.

An alternative treatment of the ferrite-bearing residues is applied in some plants, using Waelz kilns, which produce a slag, and a Zn and Pb containing fume. Similarly, a rotary flame-fired furnace of the Dorschel type can be used in a batch process. In still another approach, the leach residue is processed, using coke as fuel, in a half shaft blast furnace, producing a Zn and Pb containing fume, matte and slag. These pyro-metallurgical treatments generally result in an excellent recovery of Zn and Pb, and, for some of them, in a significant recovery of Ag, Ge and In.

These processes are however inadequate for modern zinc smelters, as they cannot be scaled up to large single-vessel operations. By this fact, they are not a cost efficient solution for today's Zn smelters.

In U.S. Pat. No. 2,932,566 oxidic zinciferous material is smelted with coke in a blast furnace and Zn is recovered from the furnace gases. In an example, fluxes are added to obtain a final slag with 61% FeO, 16% $SiO_2$, 11.5% CaO and 3% $Al_2O_3$. In U.S. Pat. No. 4,072,503 Zn-, Fe- and Pb-bearing residues are fumed in a DC arc furnace, obtaining in one example a final slag with 43% FeO, 24% $SiO_2$, 13% CaO, 6% MgO and 5% $Al_2O_3$. The smelting processes in above mentioned prior art documents take place in a packed bed or a still bath configuration, and not in an agitated bath or flash smelter at temperatures around 1300° C.

Recent literature mentions high temperature treatment of Zn-containing Fe-based secondary residues, such as EAF dusts. These temperatures are indeed needed to ensure a high Zn-fuming rate, down to low Zn content in the slag, in one single operation. In a known bath or flash smelting processes, the hitherto commonly used fayalite type of slag ($2FeO.SiO_2$) is heated to well above its melting point (of about 1100° C.) during the metallurgical operation. Such strong superheating of the slag significantly shortens the lifetime of the refractory lining of the vessel. Using a water-cooled lining counters this effect, but at the prize of greatly increased heat losses. The batchwise operations in these smelters are therefore intentionally operated at low temperatures in order to preserve the bath lining and to limit the energy consumption; this however results in a discontinuous and slow fuming.

The primary aim of the invention is to provide a process for high-rate Zn-fuming, avoiding the corrosion of the vessel lining and limiting heat losses to a reasonable value.

To this end, a process is described, which combines forced agitation with a specially formulated freeze-lining slag. By agitation it is understood that, whether in the gas phase or in the liquid phase, the reacting compounds are forcefully intermixed with means that go beyond natural convection, such as e.g. with lances, tuyeres, plasma torches or other high momentum injection techniques.

Another object of the invention concerns a so-called submerged plasma torch furnace, which is particularly suitable for implementing the invented Zn-fuming process.

The invented process for the valorisation of metal values in a Zn-, Fe- and Pb-bearing residue, comprises the steps of:
  subjecting the residue to a flash or agitated bath fuming step, thereby producing an Fe-bearing slag and Zn- and Pb-bearing fumes; and
  extracting the Zn- and Pb-bearing fumes and valorising Zn and Pb; characterised in that CaO, $SiO_2$ and MgO are added as a flux before or during the fuming step so as to obtain a final slag composition with:

$$\frac{[Fe]}{[SiO_2]} + \frac{[CaO]}{[SiO_2]} + \frac{[MgO]}{3} > 3.5;$$

$$0.1 < \frac{[CaO]}{[SiO_2]} < 1.3; \text{ and}$$

$$6 < [SiO_2] < 22,$$

all concentrations being expressed in wt %.

By combining the use of agitated bath or flash smelting processes with especially adapted freeze-lining slag compositions, which do not need superheating at the process temperature, a rapid fuming process is obtained that can be run continuously. The slag readily forms a protective crust on the refractory lining of the vessel, thereby providing adequate thermal insulation. Also, the yield of the invented process is highly increased compared to prior art processes. The process is particularly suited for treating neutral leach residue or weak acid leach residue.

Dolomite and/or limestone are advantageously used as the sole sources for flux additions. The concentration of MgO in the final slag is preferably less than 5 wt %.

If Cu is present, a matte or alloy phase is produced in the fuming step, which contains a significant part of the Cu and a significant part of the precious metals. The term significant is, in this context, to be understood as corresponding to a recovery of at least 30 wt. % of the individual metals.

If Ge is present, the major part of it is fumed together with Zn and Pb. It can then be separated from the fumes, e.g. by co-precipitation with Fe hydroxide or by addition of tannic acid. Other useful separation techniques are solvent extraction and the use of ion-exchange resins.

The fuming process can be performed in reactors such as a plasma flash furnace and a submerged lance furnace. A single-chamber submerged plasma reactor comprising a plasma fired tuyere attached to a plasma torch as heat, gas and momentum source, the tuyere being arranged such that the plasma is generated under the surface of the molten slag phase, constitutes a novel concept in the art of Zn-fuming, and is particularly well suited for implementing the invented process, because of the high energy production coupled to a small quantity of generated gases. This reactor can be equipped with water-cooled peripheral walls, and can be operated in a continuous manner.

The details of the invention are now discussed.

The fuming step consists in the reduction-smelting of the residue, whereby reductants such as natural gas, LPG, coal or cokes, and possibly fluxes such as limestone ($CaCO_3$), dolomite ($MgCO_3.CaCO_3$) and silica ($SiO_2$) are added to produce a fast fuming slag with a high melting point. This high melting point corresponds to limited superheating of the slag. This greatly facilitates freeze-lining, the formation of a crust on the inner surface of the cooled vessel walls. Limited superheating results in the formation of a relatively stable and thick crust, ensuring good thermal insulation and efficiently protecting the vessel lining from corrosion. Heat losses towards the cooled walls are thus greatly reduced. Moreover, the relatively low silica content of the slag appears to enhance the fuming rate. A slag melting point of at least 1250° C., and preferably of at least 1300° C. is recommended.

FIG. 1 illustrates slag compositions on a ternary CaO—FeO—$SiO_2$ phase diagram. Representative prior art fayalite slags are shown as areas under references 1, 2 and 3. See "*Phase Equilibria and Thermodynamics of Zinc Fuming Slagsz*", E. Jak and P. Hayes, *Canadian Metallurgical Quarterly*, vol 41, No 2, pp 163-174, 2002. The slag composition according to this invention are shown as areas under reference 4 (for 0 wt % MgO) and references 4+5 (for 5 wt. % MgO).

In most cases, the Zn-bearing residue can be fluxed according to the above criteria using limestone and/or dolomite only. Minimising the addition of silica results in a slag having the required high melting point and a fast fuming kinetics. The effect of MgO is to further increase the melting point of the slag. Due to its relatively high cost, it recommended to limit the concentration of MgO in the final slag to 5 wt. %.

In the fuming process, Zn and Pb are concentrated in the fumes. Cu is collected in a separate matte phase. Through leaching of these fumes, Zn and Pb can be separated in a Pb-containing residue and a Zn-containing leaching liquor. If the Zn-, Fe- and Pb-bearing residue also contains Ge, the Ge present in the fumes may be separated and treated batch-wise in a subsequent, Ge-rich fuming campaign. The Ge separation from the fumes is preferably performed by leaching, followed by co-precipitation with Fe hydroxide or by addition of tannic acid. The same principles apply for In.

The reactor types mentioned before lend themselves to large-scale, single-vessel operations. The overall process is compact, uses a single smelting/fuming reactor at high temperature and ensures a high metal value recovery while producing environmentally acceptable end products. The invention thus provides for an essentially waste-free process, which can compete economically with hydro-metallurgical Zn residue treatments. The slag is an environmentally acceptable output for Fe, which can be upgraded as gravel substitute in concrete. The actual valorisation of metallic Fe is unimportant due to its relatively low concentration in the contemplated residues and to its rather low intrinsic value.

A single-chamber reactor equipped with submerged plasma fired tuyeres has been specially designed for use in the above-described process. During start-up, the reactor is filled with slag, which is molten down by the plasma tuyeres until these are submerged. Then, a Zn-bearing residue is added, without the need for any special feed preparation, like drying or comminuting. The energy provided by the plasma tuyeres results in the melting of the feed and in the fuming of valuable metals like Zn, Pb, Ge and In. The reductants can be fed through the tuyeres (natural gas, LPG) or added to the feed (coal, cokes). The tuyeres are preferably submerged at a depth allowing them to contact the slag phase only, as the slag has a lower corrosive nature than the heavier other phases.

The use of the invented slag composition is preferably combined with water-cooling of the reactor's periphery: water-cooling of the side walls facilitates freeze-lining, which has, as explained above, a particularly advantageous effect.

Advantages of this furnace over the submerged lance furnace mainly stem from the use of electricity as a heat source. The submerged plasma reactor indeed achieves high flexibility through its ability to operate in a wide range of oxygen potentials, while minimising the total amount of off-gasses produced. Reduced off-gas amounts allow for a compact installation, operating with low emission of environmentally harmful gasses such as $CO_2$. Unlike a plasma flash furnace, where the molten phases settle without any agitation, the submerged plasma induces a suitable level of bath agitation, which lead to greatly accelerated reduction kinetics and which allows humid or wet materials to be directly fed into the furnace.

The following example illustrates the separation of different non-ferrous metals contained in a roasted and subsequently leached blende residue.

1500 kg of weak acid leach residue, which mainly consists of zinc ferrite ($ZnO.Fe_2O_3$), lead sulphate ($PbSO_4$), calcium sulphate ($CaSO_4$), zinc sulphate ($ZnSO_4$) and impurities like CaO, $SiO_2$, MgO, $Al_2O_3$, Ag, Cu and Ge, are dried and thoroughly mixed with 150 kg of cokes, having a purity of more than 85% C. The feed is fluxed with 90 kg of dolomite and 60 kg of limestone.

The mixture is then injected through a tuyere attached to a 1 MW air plasma torch for flash fuming at a feed rate of 12 kg/min. The furnace walls are water-cooled and protected by a thin layer of refractory at start-up. After two hours of smelting, the slag is tapped. The recovered fumes are rich in Zn and Pb, which are present as ZnO, PbO and/or $PbSO_4$.

The slag is tapped at 1325° C. with only limited superheating thanks to the fluxing of the feed resulting in a final slag composition according to the invention. Next to the slag and fumes, a separate Cu containing matte was tapped.

The analysis of the different feeds and productions is given in Table 1, together with the metal distribution across phases. "Others" refers to impurities and to bound elements such as oxygen. For the cokes, "Others" refers to ash content; for the fluxes, to impurities such as $Al_2O_3$.

TABLE 1

Material balance and metal distribution across phases

| | | Composition (wt. %) | | | | | | | | | | | |
|---|---|---|---|---|---|---|---|---|---|---|---|---|---|
| Component | Mass (kg) | Ag | Pb | Cu | Zn | Fe | CaO | SiO$_2$ | MgO | S | Ge | C | Others |
| Feed to fuming furnace | | | | | | | | | | | | | |
| Residue | 1200 | 0.06 | 4.72 | 2.40 | 23.8 | 19.0 | 2.98 | 7.15 | 0.71 | 5.90 | .008 | | 33.3 |
| Limestone | 60 | 0.00 | 0.12 | 0.10 | | | 3.00 | 50.4 | 6.10 | 0.46 | | | 10.9 | 28.9 |
| Dolomite | 90 | | 0.00 | 0.00 | 0.02 | 0.33 | 32.0 | 0.60 | 20.0 | | | 12.8 | 34.2 |
| Cokes | 150 | | | | | | | | | | | >85 | <15 |
| Total feed | 1500 | 0.05 | 3.78 | 1.92 | 19.0 | 15.3 | 6.32 | 6.00 | 1.79 | 4.72 | 0.01 | 9.71 | 31.3 |
| Products of the process | | | | | | | | | | | | | |
| Fe-slag | 500 | 0.00 | 0.01 | 0.45 | 2.47 | 20.9 | 16.8 | 16.6 | 4.93 | 2.23 | <.001 | | 35.7 |
| Matte | 175 | 0.18 | 0.09 | 8.38 | 3.39 | 56.4 | 3.11 | 0.91 | 0.46 | 16.6 | .008 | | 10.4 |
| Fumes | 500 | 0.08 | 11.3 | 2.39 | 53.5 | 5.39 | 1.10 | 1.10 | 0.27 | 6.12 | .016 | | 18.8 |
| Distribution (%) | | | | | | | | | | | | | |
| Component | Fraction (wt. %) | Ag | Pb | Cu | Zn | Fe | CaO | SiO$_2$ | MgO | S | Ge | | |
| Fe-slag | 33 | | | 8 | 4 | 48 | 88 | 92 | 92 | 10 | | | |
| Matte | 12 | | 47 | 51 | 2 | 43 | 6 | 2 | 3 | 35 | 15 | | |
| Fumes | 33 | | 53 | 100 | 42 | 94 | 8 | 6 | 6 | 5 | 55 | 85 | | |

The slag analysis shows minimal amounts of leachable heavy metals, such as Pb, ensuring that the slag is environmentally clean. The high percentage of "Others" in the slag is attributable to oxygen bound to the metals.

The environmental stability of the slag was tested on the slag as such and after formation of concrete containing 30% slag and 10% cement. The tests were performed according to European norm NEN 7343, whereby the material is broken to less than 4 mm and percolated with acidified water. The leachability was assessed according to the Flemish VLAREA ("Vlaams reglement voor afvalvoorkoming en-beheer") norm for non-ferro metallurgical slags. The leachability of both the slag and the slag-containing concrete proved to be well below the limits applicable to products intended for the building industry.

The invented process thus achieves the separation of the metals as follows:

Zn, Pb and Ge in the fumes, which can be treated by known means for separation of Pb and Ge in different residues, and of Zn in a leach liquor;

Cu and precious metals in a matte or alloy, which can be refined using a classical Cu and precious metals flow-sheet;

Fe in an inert, environmentally clean slag, reusable as e.g. gravel substitute in concrete.

The invention claimed is:

1. A process for the valorisation of metal values in a Zn-, Fe- and Pb-bearing residue, comprising the steps of:
   subjecting the residue to a flash or agitated bath fuming step, thereby producing an Fe-bearing slag and Zn- and Pb-bearing fumes; and
   extracting the Zn- and Pb-bearing fumes and recovering Zn and Pb from the fumes; wherein either one or more of CaCO$_3$, SiO$_2$ and MgCO$_3$ are added as a flux before or during the fuming step so as to obtain a final slag composition with:

$$\frac{[Fe]}{[SiO_2]} + \frac{[CaO]}{[SiO_2]} + \frac{[MgO]}{3} > 3.5;$$

$$0.1 < \frac{[CaO]}{[SiO_2]} < 1.3; \text{ and}$$

$$6 < [SiO_2] < 22,$$

all concentrations being expressed in wt %.

2. A process according to claim 1, wherein the Zn-, Fe- and Pb-bearing residue is a neutral leach residue or a weak acid leach residue.

3. A process according to claim 2, wherein only one or both of dolomite and limestone are added as a flux.

4. A process according to claim 1, wherein the concentration of MgO in the final slag is less than 5 wt %.

5. A process according to claim 1, wherein the Zn-, Fe- and Pb-bearing residue contains Cu and precious metals, and, during the fuming step, a matte or alloy is produced containing a significant part of the Cu and a significant part of the precious metals.

6. A process according to claim 1, wherein the Zn-, Fe- and Pb-bearing residue contains Ge, a major part of the Ge is fumed together with Zn and Pb, and the residue is subsequently separated.

7. A process according to claim 6, whereby the separation of Ge is performed by co-precipitation with Fe hydroxide or by addition of tannic acid.

8. A process according to claim 1, whereby the process is performed in a reactor selected from the list consisting of a plasma flash furnace and a submerged lance furnace.

9. A process according to claim 1, whereby the fuming step is performed in a reactor containing a molten phase and comprising one or more plasma tuyeres as heat and gas sources, said tuyeres being arranged such that the plasma is generated under the surface of said molten phase.

* * * * *